United States Patent
Yoon et al.

(10) Patent No.: US 6,821,679 B2
(45) Date of Patent: Nov. 23, 2004

(54) FABRICATION METHOD OF $LiCoO_2$ NANO POWDER BY SURFACE MODIFICATION OF PRECURSOR

(75) Inventors: Young-Soo Yoon, Kwachun (KR); Won-Kook Choi, Seoul (KR); Ho-Young Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/346,865

(22) Filed: Jan. 17, 2003

(65) Prior Publication Data

US 2004/0081612 A1 Apr. 29, 2004

(30) Foreign Application Priority Data

Oct. 29, 2002 (KR) .................................. 10-2002-0066248

(51) Int. Cl.[7] .......................... H01M 4/52; C01B 13/14; C01D 15/00
(52) U.S. Cl. ................................ 429/231.3; 252/518.1; 252/521.2; 423/592; 423/593; 423/594
(58) Field of Search ......................... 429/218.1, 231.3; 423/592–594; 252/518.1, 521.2; 29/623.1

(56) References Cited

U.S. PATENT DOCUMENTS 5,478,674 A * 12/1995 Miyasaka ................ 429/231.3
5,538,814 A * 7/1996 Kamauchi et al. .......... 429/303

FOREIGN PATENT DOCUMENTS

JP 06020679 * 1/1994 ............ H01M/4/02
JP 410114527 * 5/1998 ............ H01M/4/02

* cited by examiner

Primary Examiner—Mark Ruthkosky
(74) Attorney, Agent, or Firm—Darby & Darby

(57) ABSTRACT

$LiCoO_2$ nano powder of a high-temperature polymorph having a small and uniform size of grains which is obtained by modifying a surface of a precursor by mixing inert soluble salt on a Li-Co acetate precursor, and by heating the surface-modified precursor is provided, and a battery manufactured by using the powder as the cathode material has very excellent charging/discharging characteristics.

5 Claims, 6 Drawing Sheets

FABRICATION METHOD OF LICOO2 NANO POWDER BY SURFACE MODIFICATION OF PRECURSOR

BACKGROUND OF THE INVENTION

1. Field of the Invention

The present invention relates to a fabrication method of $LiCoO_2$ nano powder by a surface modification of a precursor.

2. Description of the Background Art

A secondary battery which is widely used uses $LiCoO_2$ powder as the cathode materials. In fabricating the powder, a method of mixing lithium carbonate and cobalt trioxide and calcining the mixture at a high temperature is used. Such method is performed at higher than 800° C. to obtain $LiCoO_2$ of high temperature polymorph. In high temperature heating, growth of grain is occurred and in case of widely used powder, the size of the grain reaches 5~10 μm. In addition, since the growth of the grain depends on contact state among grains, homogeneous grain size distribution of the grain which is finally obtained after calcining becomes very ununiform. Such characteristic is one of reasons that difference of powder characteristic for each batch for powder fabrication is caused.

In case the size of the grain is large, since removing/inserting rate of $Li^+$ ion is relatively low in charging/discharging, it does not matter at a relatively low discharging rate, but capacity is faded at higher discharging rate. Also, there are many defections by broken bonds on the surface of the grain, and $Li^+$ ions are trapped on the defective portion. Therefore, capacity fade is generated by charging/discharging.

In case the size and distribution of the grain are very uniform, there is an advantage that reproducibility in subsequent battery fabrication processes become excellent. Also, in case the size of the grain becomes smaller, the moving rate of the $Li^+$ ion is relatively increased, and accordingly capacity fade according to high-speed discharging can be prevented, thus to enable manufacture of a high-output battery.

By the above reasons, there is an increasing demand for new $LiCoO_2$ powder having a very small grain size and very uniform grain distribution.

SUMMARY OF THE INVENTION

Therefore, an object of the present invention is to provide $LiCoO_2$ powder of a high temperature polymorph and a fabrication method thereof having a very small and uniform grain size.

To achieve these and other advantages and in accordance with the purpose of the present invention, as embodied and broadly described herein, there is provided a fabrication method of $LiCoO_2$ nano powder, including the steps of preparing a Li—Co acetate precursor modifying a surface of the precursor by mixing the precursor with inert soluble salt obtaining $LiCoO_2$ powder heating the surface-modified precursor, and removing inert soluble salt from the powder.

The inert soluble salt is selected among $K_2SO_4$, $(NH_4)_2CO_3$, NaCl and KCl, and the amount of Li in the precursor is 100%~130%.

In the present invention, the $LiCoO_2$ powder is obtained by cooling and drying by mixing initial materials, modifying the surface with an appropriate modifier, and heating the resultant material differently from the calcining method after simply mixing the conventional materials of the high temperature polymorph.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Fabrication of $LiCoO_2$ Powder

Firstly, Li—Co acetate precursor was prepared by cooling and drying processes as follows. A mixture solution of Li and Co was made by mixing Li acetate (W=102) and Co acetate (W=249) at a rate of 1.2:1 in distilled water (here, W designates molecular weight). For completely dissolving acetate, magnetic stirring was conducted at a temperature of 50° C. for more than 30 minutes.

Then, the mixed solution was sprayed to the cooling dryer having liquid nitrogen. Through the spraying process, very small droplets were rapidly cooled under the liquid nitrogen condition and then a nano-sized solid material was obtained. Then, the mixed solution which was educed was poured into a flask which was cooled to 30° C. together with the remained liquid nitrogen. At this time, in case the remained liquid nitrogen is small, the amount of the initial liquid nitrogen must be appropriately adjusted since the educed mixed solution can be resolved again. After having the liquid nitrogen completely get out of the cooled flask, a vacuum condition was formed using a vacuum pump. At this time, the degree of vacuum was maintained as $6 \times 10^{-2}$ torr. In case the temperature of the flask is 30° C., the condition is also completely dried condition.

The fabricated Li—Co acetate precursor was mixed with $K_2SO_4$, one of inert soluble salt, as the surface-modifying material at a weight ratio of 1/6 of the precursor. Similar grain sizes were obtained in both hand mixing and ball mixing. The hand mixing and ball mixing were performed respectively for 20 minutes and 12 hours.

The Li—Co acetate precursor mixed with the modified material was heated in the air to 400° C. at a temperature raising rate of 3° C. per minute, and then maintained for 6 hours. By the heating, carbon substance was removed and a low temperature polymorph of $LiCoO_2$ powder was formed. To obtain high temperature polymorph of the fabricated powder, the powder was heated in the air to 800° C. for 12 hours. After completing such process, 3 times of washing was performed in distilled water to remove inert soluble salt on the surface of the powder (100 cc of distilled water per 3 g of mixture), and then pure $LiCoO_2$ powder was obtained by centrifugation.

Characteristic Analysis

Figure 1A:
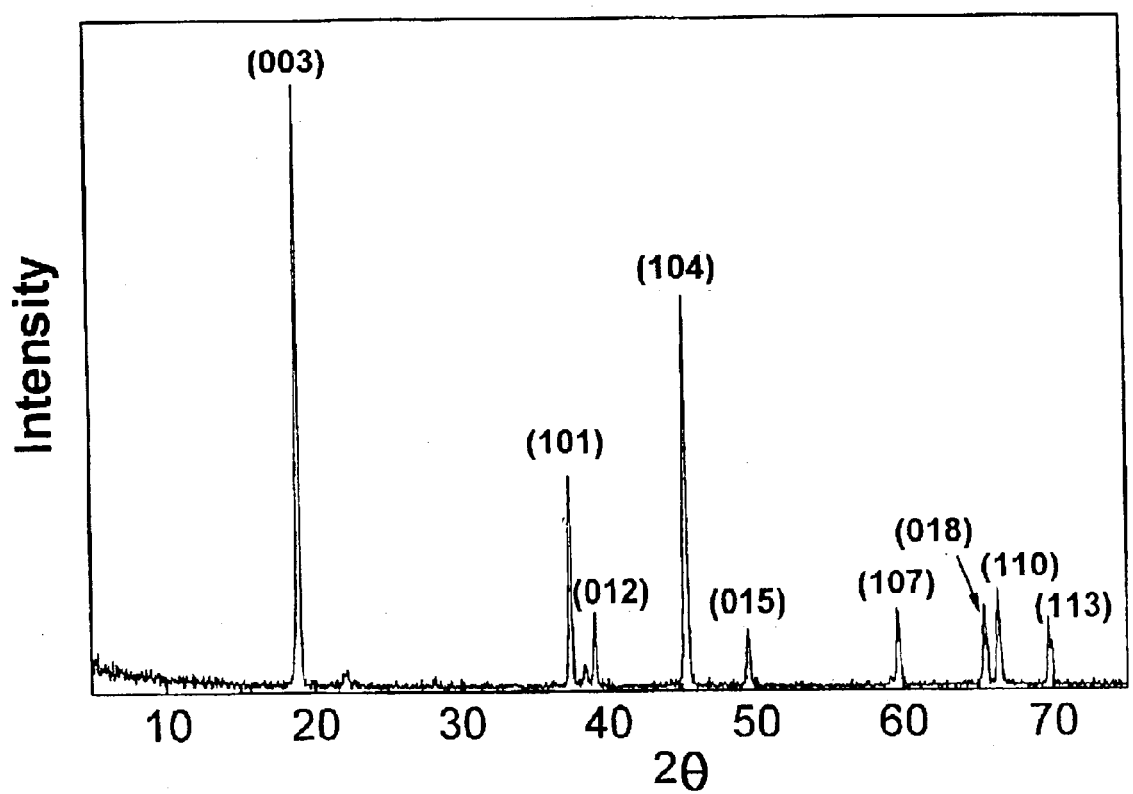
FIG. 1A is a view showing an XRD pattern of $LiCoO_2$ powder which is fabricated by the present invention.
Figure 1B:
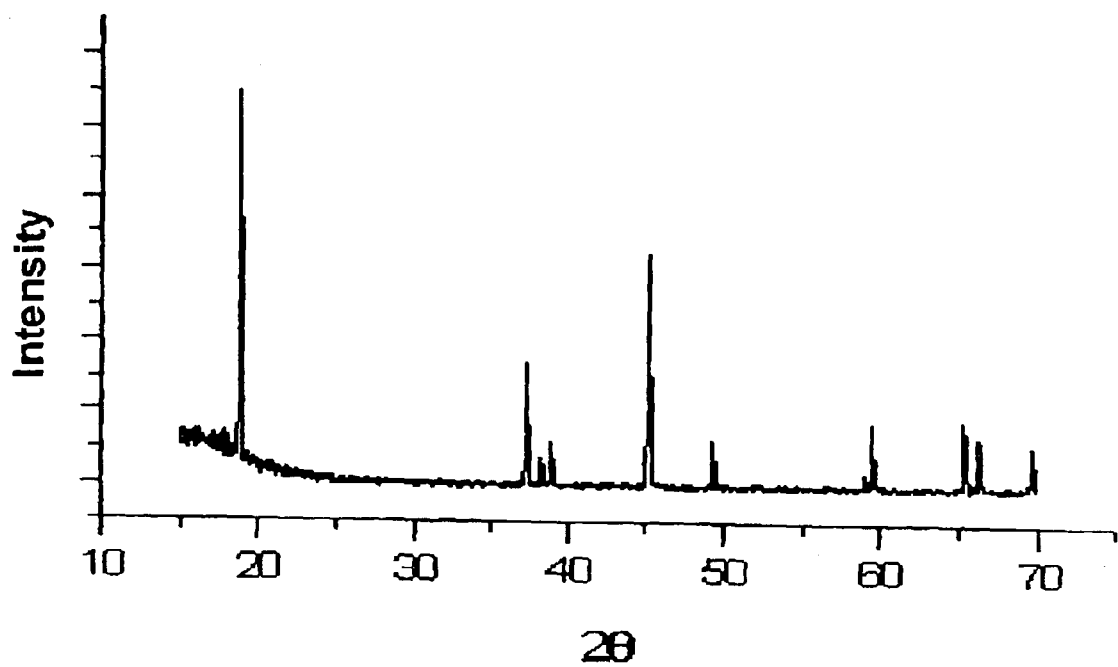
FIG. 1B is a view showing an XRD pattern of conventional $LiCoO_2$ powder.

To check crystal characteristic of the fabricated $LiCoO_2$ powder, an X-ray diffraction (XRD) pattern was investigated. FIG. 1A is a view showing an XRD pattern of the $LiCoO_2$ powder in accordance with the present invention, and FIG. 1B is a view showing the XRD pattern of the $LiCoO_2$ powder widely in use which is used to manufacture a secondary battery. The crystal characteristic of the powder fabricated in accordance with the present invention is identical as the typical crystal characteristic of the commercialized powder, and it is noted that the XRD peak intensity ratio between the determined directions were almost similar. In addition, a very strong (003) peak was found near $2\theta=18.6°$, and this shows that the fabricated $LiCoO_2$ powder is formed in a lamellar structure having a hexagonal crystal structure and is high-temperature polymorph of the typical $LiCoO_2$ powder. In case of the low-temperature $LiCoO_2$, the (003) peak is generated at $2\theta=18.8°$. This means that the surface-modifying material covered by the Li—Co precursor does not affect on the crystal characteristic of $LiCoO_2$.

Figure 2A:
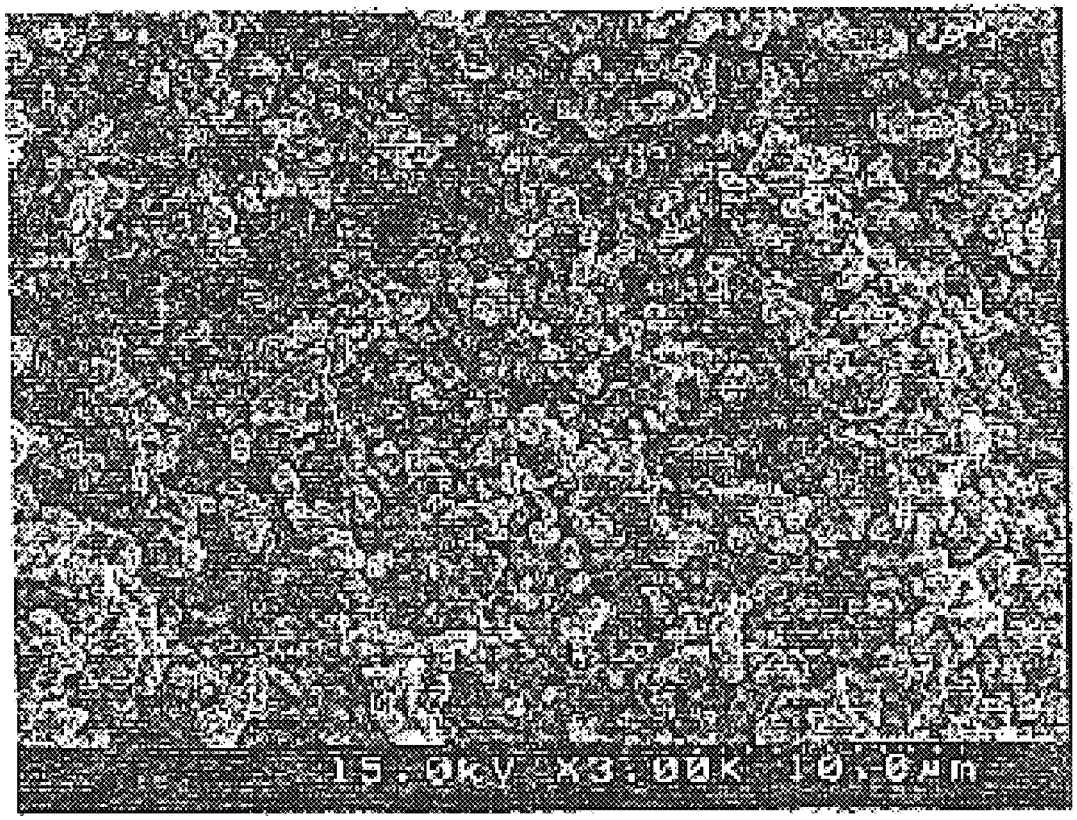
FIG. 2A is a SEM photo showing a shape of the $LiCoO_2$ powder fabricated in accordance with the present invention.
Figure 2B:
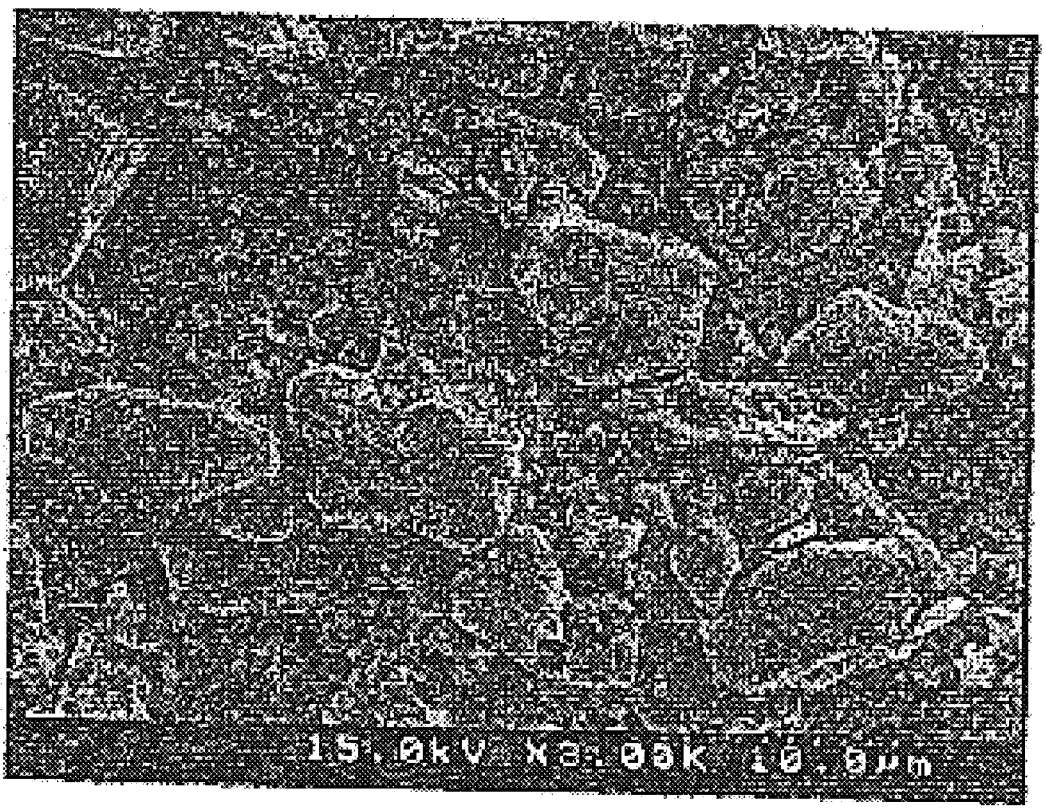
FIG. 2B is a SEM photo showing a shape of the $LiCoO_2$ powder fabricated without surface modification.

The size and shape of the $LiCoO_2$ grain which was phase-transited to a complete high-temperature polymorph was analyzed with a scanning electron microscopy. FIG. 2A is a SEM photo showing the powder obtained from the surface-modified Li—Co precursor which is covered with $K_2SO_4$, and FIG. 2B is a SEM photo showing the powder obtained by heating Li—Co precursor without surface-modifying. In FIG. 2A, in case the precursor is not covered by the surface modifier, grains having a size as 4~7 μm in average and maximum to 10 μm by heating were shown. In addition, an ununiform grain shape of a very angular shape can be shown. On the contrary, as shown in FIG. 2A, in case the precursor is covered by the surface modifier, the size of the grain is 300 nm in average, and the shape of the grain is also a shape of a well developed facet.

Generally, difference of the grain shape is generated by difference of crystal characteristic in case of an identical material. However, in case of the two powders shown in FIGS. 2A and 2B, since an identical heating process is performed as the identical precursor, it is determined that difference in the grain shape was caused by whether the precursors were contacted each other in the growing process of the grains rather than difference of crystallinity (almost identical peak pattern is shown in the XRD result). That is, in case of the Li—Co covered by the $K_2SO_4$ which is a surface-modifying material, since there is no contact among the precursors, the growth of the grains is restrained, and accordingly only changes of crystallinity and shape of the grains were generated. On the other hand, in case the surface modifier is not well covered, it is determined that changes of the grain shape according to the growth by the mutual absorption among the precursors as well as changes in the crystallinity and shape of the grains by contact among the grains were also generated. An overall distribution of grain size, that is, granularity as well as the size and shape of the grains also shows very different characteristics. As shown in FIG. 2B, in case of the powder without the surface modifier, it can be shown that it is composed of grains of various sizes. On the contrary, in FIG. 2A, it is noted that the powder is composed of grains of a uniform size. That is, by the process used in the present invention, manufacture of $LiCoO_2$ having a homogeneous grain size distribution is possible.

Manufacture of a Battery

Such unit battery was manufactured using the fabricated powder. The fabricated $LiCoO_2$ powder was mixed with a conductive agent AB (Acethylene Black) and binder PVdF (13% of polyvinylidene fluoride) respectively at rates of 87 wt %, 7 wt % and 6 wt %, and NMP (1-methyl-2-pyrrolinone) and acetone were added. Then, the resultant material was mixed to have a uniform viscosity at a rate of 5000 rpm in a high-speed agitator. At this time, viscosity was maintained in about 10000~15000 cp as the apparent viscosity.

The mixture was coated on an aluminum thin plate which is a current collector by a doctor blade having a thickness of 200 μm. Then, after drying the plate at 80° C. for an hour, the plate is cut into a size of 3×4 $cm^2$, and the parts are rolled at 100° C. Then, the cathode was completed by drying the parts in the dried oven for 24 hours again.

After completing fabrication of the cathode, a material formed by infiltrating a solution having a rate of EC:EMC:DMC as 1:1:1, in which 1 M $LIPF_6$ salt is dissolved was used as the electrolyte on the PP (polypropylene) separator of 20 μm. Manufacture of a battery was completed by sealing with a vacuum pack under the condition that a carbon anode is abutted on the electrolyte and the cathode and anode terminals are exposed. Every processing was performed at humidity of lower than 0.3%.

Charging/Discharging Test

Figure 3A:
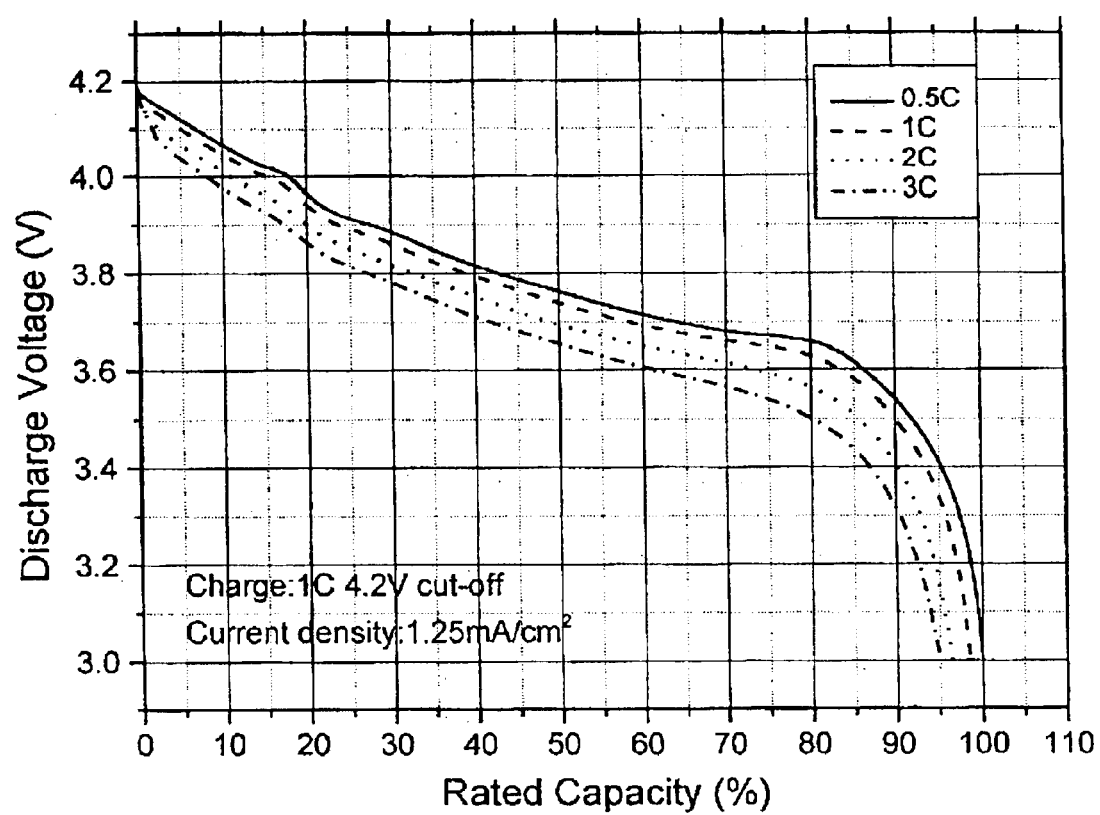
FIG. 3A is a graph illustrating charging/discharging characteristics of the $LiCoO_2$ powder fabricated in accordance with the present invention.
Figure 3B:
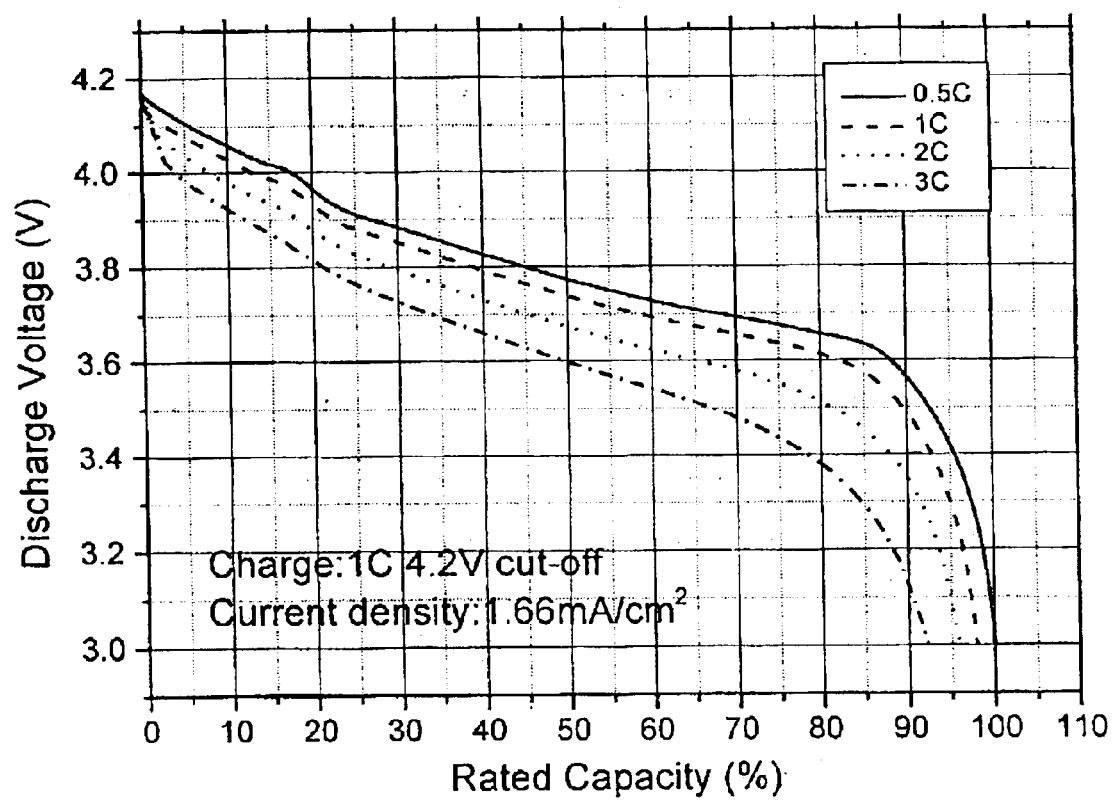
FIG. 3B is a graph illustrating charging/discharging characteristics of the conventional $LiCoO_2$ powder.

To test the electrical-chemical characteristic of the $LiCoO_2$ powder in accordance with the present invention, charging/discharging tests of the battery were performed, and the results were shown in FIG. 3A. The discharging rate (C rate) was varied to 0.5, 1, 1.5 and 2C to compare the characteristic according to the discharging rate. (In the drawing, the discharging rate is shown respectively as 0.5C, 1C, 2C, 3C) The cut-off voltage region is set as 4.2–3.0V. The results of the charging/discharging tests of the battery which was made by using a cathode material fabricated in the Semi corporation in Japan is shown in FIG. 3B for comparison. In the drawing, it is noted that the overall discharging aspects are very similar. It is shown that the overall capacities as well as discharging aspects are almost identical in 0.5 and 1C. The discharging capacity of the battery which used the powder which was fabricated in the present invention as the cathode materials was larger, and such difference was more apparent at the discharging rate of 2C. That is, it is noted that the battery which used the powder which was fabricated in the present invention as the cathode materials has a more excellent high-speed discharging characteristic.

In addition, since the shape of the grain is much more round than in the case of the common powder, defection by broken boding of $LiCoO_2$ on the surface of the grain can be reduced, it can be expected that capacity drop after charging/discharging is smaller than in case the common powder is used.

The above described fabrication method can be applied to fabricate another lithium-alloy oxide powders. For instance, Li-M which is a lithium alloy used for the battery (here, M is Ni, Mn, or M-Ni—Mn alloy) may be fabricated as nano-sized powder using the method disclosed in the present invention.

In accordance with the present invention, LiCoO$_2$ powder of a high-temperature polymorph having a very small and uniform size of grains can be fabricated. A battery with an excellent electric characteristic can be manufactured by using such LiCoO$_2$ as the cathode materials. In addition, the present invention can be applied to fabricate various metal oxide nano grains as well as cathode materials of the battery.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of preparing LiCoO$_2$ nano powder, comprising the steps of:

preparing a Li—Co acetate precursor;

modifying a surface of the precursor by mixing the precursor with an inert soluble salt;

obtaining LiCoO$_2$ powder by heating the surface-modified precursor; and removing the inert soluble salt from the powder.

2. The method of claim 1, wherein the surface modification of the precursor is performed by mixing the precursor and inert soluble salt in a mechanical-chemical method.

3. The method of claim 1, wherein the inert soluble salt is one which is selected from K$_2$SO$_4$, (NH$_4$)$_2$CO$_3$, NaCl and KCl.

4. The method of claim 1, wherein the Li—Co acetate precursor is prepared by (i) mixing Li acetate and Co acetate with water to form a solution, and (ii) cooling and drying the mixed solution.

5. The method of claim 1, wherein the heating includes a first heating for obtaining powder from the precursor, and a second heating for phase transformation to a high temperature polymorph.

* * * * *